United States Patent [19]

Ichimura et al.

[11] Patent Number: 4,963,448

[45] Date of Patent: Oct. 16, 1990

[54] PHOTORECORDING ELEMENT AND LIQUID CRYSTAL CELL COMPRISING THE SAME

[75] Inventors: Kunihiro Ichimura; Yasuzo Suzuki; Takahiro Seki; Masako Sakuragi, all of Tsukuba; Takashi Tamaki, Ibaraki; Akira Hosoki; Koso Aoki, both of Tsukuba, all of Japan

[73] Assignees: Agency of Industrial Science & Technology; Ministry of International Trade & Industry, both of Tokyo, Japan

[21] Appl. No.: 238,398

[22] Filed: Aug. 31, 1988

[30] Foreign Application Priority Data

Aug. 31, 1987 [JP] Japan .................................. 62-217317
Mar. 30, 1988 [JP] Japan .................................. 63-77785
Mar. 30, 1988 [JP] Japan .................................. 63-77786

[51] Int. Cl.$^5$ ...................... G03C 1/685; G03C 1/73; G02F 1/1337; C09K 9/52
[52] U.S. Cl. ........................................ 430/20; 430/19; 430/945; 430/962; 428/1
[58] Field of Search ................... 430/20, 19, 945, 962; 428/1

[56] References Cited

U.S. PATENT DOCUMENTS 4,686,169 8/1987 Yoshino et al. ...................... 430/339
4,729,637 3/1988 Sato et al. ......................... 350/339 F
4,737,311 4/1988 Scheuble et al. ................. 252/299.61

OTHER PUBLICATIONS

Journal of the American Chemical Society/93:25/, Dec. 15, 1971, pp. 7088–7090, E. Sackmann, "Photochemically Induced . . . ".
Journal De Chimie Physique, vol. 73, 1976, pp. 795–798, B. Schnuriger, et al., "Photoisomerisation Dans Le Milieux . . . ".
J. Electrochem. Soc., vol. 121, No. 12, Dec., 1974, pp. 1666–1669, W. E. Haas, et al., "U.V. Imaging with Nematic Chlorostilbenes".
Collected Paper of the Electrical Communications Association, vol. J–62–C, No. 3, 1979, pp. 179–184, S. Sato, et al.
Japanese Journal of Applied Physics, vol. 21, No. 7, Jul., 1982, pp. 969–973, K. Ogura, et al., "Smectic Liquid Crystal . . . ".
Glossary of Lectures for the 52nd Spring Meeting of Japan Chemical Society, 1986, p. 787.
Chemistry Letters, 1987, pp. 911–914, The Chemical Society of Japan, S. Tazuke, et al., "Amplified Image Recording in Liquid . . . ".

*Primary Examiner*—Paul R. Michl
*Assistant Examiner*—Mark R. Buscher
*Attorney, Agent, or Firm*—Oblon, Spivak, McClelland, Maier & Neustadt

[57] ABSTRACT

A photorecording element is disclosed which consists of a transparent substrate, a molecular layer of an organic compound with an ability to change structure reversibly by virtue of light and disposed in direct contact with the transparent substrate, and a layer of liquid crystals disposed in direct contact with the molecular layer. A liquid crystal cell comprising the photorecording element is also disclosed. A modification having fine deformations on the surface of the transparent substrate and a modification having a dichroic dye contained in the layer of liquid crystals are embraced by the present invention.

10 Claims, 4 Drawing Sheets

PHOTORECORDING ELEMENT AND LIQUID CRYSTAL CELL COMPRISING THE SAME

BACKGROUND OF THE INVENTION

1. Field of the Invention

This invention relates to a novel photorecording element which utilizes a change in the orientation of liquid crystal by light and to a liquid crystal cell comprising the same photorecording element. More particularly, this invention relates to a photorecording element which effects temporary or permanent recording of information by utilizing the change caused in the orientation of a liquid crystal layer by a compound capable of reversibly changing structure upon irradiation by light and to a liquid crystal cell which comprises the photorecording element.

2. Prior Art Statement

As recording elements using a liquid crystal, those which depend on the storage of information by electrical action and those which depend on the storage of information by the action of light have been known to the art. Those of the former kind are chiefly used for display devices.

The liquid crystal display which writes information by virtue of an electrical action suffers erasure of information when the power supply is turned off and, therefore, requires a special device to ensure permanent preservation of information. Further, since it inevitably uses patterned electrodes, it has an insufficient resolving power and is not suitable as a recording element of high capacity.

The recording elements which effect storage of information by the action of light include those of the type which utilize the heat generated by a light of high luminance such as a laser beam which causes a change in the phase of liquid crystal and those of the type which effect a change in the phase of liquid crystal by the action of light caused through the agency of a compound having an ability to change structure photochemically and which is incorporated in the liquid crystal in advance The recording elements of the type utilizing heat, such as of a laser beam, are usable for high-density recording. Since they can be used only for hit recording, however, they have only limited applications. Then, the recording elements of the type which attain a change in phase by virtue of the action of a light upon a compound able to change structure photochemically and incorporated in the liquid crystal in advance exhibit an outstanding resolving power during the early stage of the storage of input information. Because of the fluidity of liquid crystals, however, they are liable to suffer a remarkable loss of resolving power with lapses of time. For example, the photochromic cholesteric liquid crystal which is obtained by dissolving azobenzene, a chiral compound, in a nematic liquid crystal is transformed by the action of ultraviolet light into an isotropic phase and is enabled to attain recording of information by virtue of this transformation of phase. However, it has a disadvantage in that the liquid crystal eventually begins to flow and the recorded image begins to lose sharpness (Glossary of Lectures for the 52nd Spring Meeting of Japan Chemical Society, 1986).

OBJECT AND SUMMARY OF THE INVENTION

This invention has been made for the purpose of providing a photorecording element which attains recording of information by virtue of a change caused in the orientation of liquid crystals by light and which does not entail any degradation of resolving power with lapses of time because of the flowability of liquid crystals and a liquid crystal cell which comprises a photorecording element.

The inventors have continued a study with a view to developing a photorecording element by utilizing the change caused in the orientation of liquid crystals by light. They have consequently found that when a molecular layer of a compound capable of reversibly changing structure by the action of light is deposited on a substrate and a liquid crystal layer is superposed on the molecular layer, the liquid crystal is reversibly oriented parallel or vertically, depending on the two structures which the compound is enabled to assume reversibly by the action of light, that the liquid crystal layer is rapidly oriented even when the number of molecules in the liquid crystal layer is 10,000 or more times the number of molecules in the molecular layer of the compound, and that the liquid crystal phase, therefore, is not changed unless the state of the light is changed and the information recorded thereby is retained intact for along time. This invention has been perfected based on this finding.

To be specific, this invention is directed to a photorecording element consisting of a transparent substrate, a molecular layer of an organic compound with an ability to change structure reversibly by virtue of light and deposited directly on the transparent substrate, and a liquid crystal layer superposed directly on the molecular layer and to a liquid crystal cell comprising the photorecording element. A modification having dichromatic coloring matter incorporated in the, liquid crystal layer and a modification having concave and convex area formed on the surface of the transparent substrate held in direct contact with the molecular layer of the organic compound are embraced by the present invention.

The above and other objects and features of the invention will become more apparent from the following detailed description with reference to the accompanying drawings.

DETAILED DESCRIPTION OF THE PREFERRED EMBODIMENTS

Figure 1:
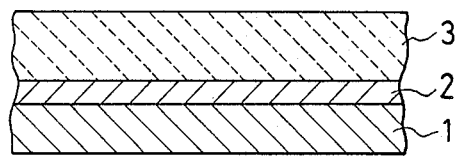
FIG. 1 is a cross section illustrating the basic construction of the photorecording element of the present invention.

As the transparent substrate in the present invention, sheets of various materials such as ordinary silica glass, hard glass, quartz, and various plastics and the same sheets having coating of such metal oxides as silicon oxide, tin oxide, indium oxide, aluminum oxide, titanium dioxide, chromium oxide, and zinc oxide and coating of silicon nitride and silicon carbide deposited on their surface are usable.

Generally, liquid crystals are used in a construction sandwiched between two substrates. In the present invention, it suffices that at least either of the two substrates is transparent. Optionally, the other substrate may be a sheet which is either made of or coated with such a material as copper, iron, aluminum, or platinum. These substrates are generally used each in the form of a sheet of flat and smooth surface 0.01 to 1 mm in wall thickness.

In this invention, the phenomenon described below occurs when the surface of the transparent substrate held in direct contact with the molecular layer of the organic compound is finely deformed, i.e. incised with minute concave and convex areas.

As means for finely deforming the surface of the substrate, the rubbing method which consists in gently rubbing the surface of the substrate in one direction with cotton cloth and the diagonal vacuum deposition method which consists in vacuum depositing such an oxide as silicon oxide, serving as an orienting agent, diagonally on the surface of the substrate in a thickness in the range of several hundred to several thousand Angstroms can be employed.

This invention requires that a molecular layer of a compound capable of reversibly changing structure by virtue of light be formed on the substrate of the foregoing description. As the compound for this molecular layer, a photochromic compound is used most commonly.

This term "photochromic compound" refers to a compound which produces a change in structure by virtue of light and consequently changes the behavior thereof such as color tone in response to light. To date, a wide variety of compounds which utilize photogeometric isomerization, valency photoisomerization, heterolytic photoring opening and closing reactions, photoring closing reaction and phototautomerization reaction of unsaturated double bonds between carbon and carbon, between carbon and nitrogen, and between nitrogen and nitrogen have been known to the art "Photochromism", compiled by G. H. Brown and published by Wiley InterScience Company, 1971). Of these compounds, typical photochromic compounds resorting to the photogeometric isomerization include those having azobenzene, indigo, thioindigo, selenoindigo, perinaphthoindigo, hemiindigo, hemithioindigo, stilbene, polyene and azomethine as main structures. Typical photochromic compounds resorting to the heterolytic photoring opening and closing reaction include those having indolinospirobenzopyran, indolinospironaphthooxazine, benzothiazolinospirobenzopyran, indolinospirobenzothiopyran, and spiroindolizine as main structures. Typical photochromic compounds resorting to the photoring closing reaction include those having stilbene and fulgide as main structures. And typical photochromic compounds resorting to the phototautomerization reaction include those having salicylidene anil, o-hydroxyazobenzene, and o-nitrobenzyl as main structures.

Among the photochromic compounds cited above, azobenzene derivatives, indigo derivatives, hemithioindigo derivatives, indolinospirobenzopyran derivatives, and spiroindolizine derivatives prove to be particularly desirable. This is because these compounds produce marked changes in polarity due to change of molecular structure before and after exposure to light.

In the present invention, the formation of a molecular layer of this photochromic compound on the substrate can be attained by any of the conventional methods used for vertical orientation of liquid crystal. The method which consists in treating the substrate with a photochromic compound possessing a surface active group, the method which consists in making the treatment with a photochromic compound possessing a silyl group substituted with at least one halogen atom or alkoxy group, and the method which consists in treating the surface of the substrate with an amino group-containing silylizing agent and subsequently binding to the treated surface a photochromic compound possessing a carboxyl group (J. Cognavd, "Molecular Crystals and Liquid Crystals", Subliment 1 (1982) and Shoichi Matsumoto, and Ichiro Kakuta, "Latest Technology on Liquid Crystals", 1983) can be employed.

As concrete examples of the surface active group in the aforementioned surface active group-containing photochromic compound, carboxylic acid residues, malonic acid residue, alkyl aluminum salt residues, alkyl pyridinium salt residues, alkyl quinolinium salt residues, carboxy chromium complex residues, ester residues, nitrile residues, urea residues, amine residues, alcohol residues, phenol residues, and betaine residues can be cited. The application of the surface active group-containing photochromic compound to the surface of the substrate can be effected by directly spreading this compound on the surface of the substrate or by using this compound as dissolved in the liquid crystal substance. In the latter case, the amount of the surface active group-containing photochromic compound to be added to the liquid crystal substance is in the range of 0.01 to 5.0% by weight, preferably 0.5 to 3.0% by weight, based on the weight of the liquid crystal.

As concrete examples of the aforementioned photochromic compound possessing a silyl group substituted with at least one halogen atom or an alkoxy group, there can be cited triethoxysilyl substituted azobenzenes, monochlorodiethoxysilyl substituted azobenzenes, trichlorosilyl substituted azobenzenes, triethoxysilyl substituted indigoes, and triethoxysilyl substituted indolinospirobenzopyrans. The treatment with this photochromic compound is attained by preparing a solution containing the compound in a concentration in the range of 0.1 to 10%, preferably 0.5 to 5% and applying this solution to the surface of the substrate or immersing the substrate in the solution. Examples of the solvent advantageously used for the preparation of this solution include water, acetic acid, toluene, acetone, and dimethyl formamide. The time required for this treatment is in the range of 1 second to 1 hour, preferably 30 seconds to 10 minutes. The binding force with which the photochromic compound is deposited on the surface of the substrate can be enhanced by carrying out the present method in combination with a treatment of the surface of the substrate with a silylizing agent.

Concrete examples of the silylizing agent to be used in the process which comprises treating the surface of the substrate with an amino group-containing silylizing agent and subsequently treating the treated surface with a carboxyl group-containing photochromic compound include aminopropyl triethoxysilane, aminopropyl diethoxysilane, aminobutylmethyl diethoxysilane, and aminobutyl triethoxysilane. The treatment with the silylizing agent is effected by preparing a solution containing the silylizing agent in a concentration in the range of 0.1 to 10%, preferably 0.5 to 5% and applying the solution to the surface of the substrate or immersing the substrate in the solution. Examples of the solvent advantageously used for the preparation of the solution include water, ethanol, acetic acid, toluene, acetone, and dimethyl formamide. The time required for this treatment is generally in the range of several seconds to some tens of minutes.

After this treatment with the silylizing agent an amide bond is formed on the treated surface by causing the carboxyl group-containing photochromic compound to react with the amino group in the silylizing agent by the conventional method. In the manner described above, the photochromic compound can be chemically bonded to the surface of the substrate.

The compound with an ability to cause a reversible change in structure by virtue of light and intended to be bonded to the surface of the substrate needs only be deposited in the form of a unimolecular layer. Optionally, this compound may be deposited in the form of a bimolecular layer or higher order molecular layer. Layers of polymers substituted with photochromic residues are also applicable to the present invention by cooling them on transparent substrates.

The liquid crystal for the formation of the liquid crystal layer on the molecular layer of the compound capable of causing a reversible change in structure by virtue of light can be freely selected from among the conventional liquid crystal substances of the nematic system, the smectic system, and the cholesteric system. In the case of liquid crystal substances of the smectic system, that which is selected for use in this invention must be capable of assuming a nematic liquid crystal phase at a certain temperature. The liquid crystal substances available for this invention comprise not merely those of low molecular weight but also those of high molecular weight.

The liquid crystal substances of the foregoing description are described in A. Bequin et al, "Molecular Crystals and Liquid Crystals", vol. 115, page 1.

The liquid crystal substances of high molecular weight are described in "Advances in Polymer Science", Vols. 60/61 (1985), for example. These liquid crystal substances may be used either singly or in the form of a mixture of two or more members.

Low molecular weight liquid crystals usable in this invention include:
p-(n-alkyl)phenyl p-(n-alkyl)benzoates
p-(n-alkyl)phenyl p-(n-alkoxy)benzoates
p-(n-alkoxy)phenyl p-(n-alkyl)benzoates
p-(n-alkoxy)phenyl p-(n-alkoxy)benzoates
4-(n-alkyl-4'-cyanobiphenyls
4-(n-alkyl)-4'-cyanobiphenyls
4-n-alkyl-4'-bicyanoterphenyls
p-(n-alkyl)phenyl 4-(n-alkylcyclohexanecarboxylates)
p-(n-alkoxy)phenyl 4-alkylcyclohexanecarboxylates
1-(n-alkyl)-4-(p-cyanophenyl)cyclohexanes
1-(n-alkyl)-4-(p-alkylphenyl)cyclohexanes
4-(n-alkyl)-4'-[(4''-alkylcyclohexyl)cyclohexyl]benzenes
where the number of carbon of alkyl or alkoxy groups is between 1 and 8.

Polymeric liquid crystals having the following repeating units are also usable:

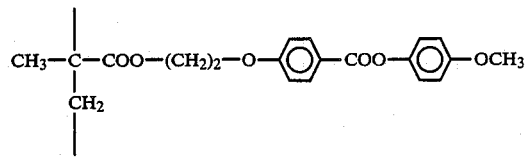

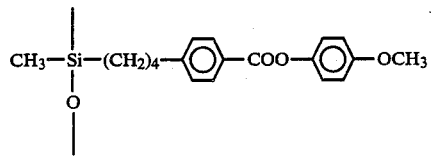

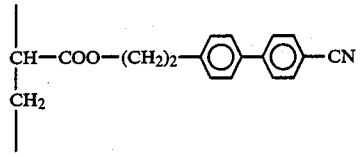

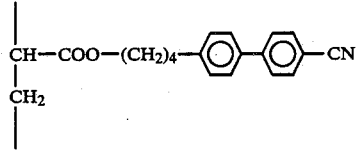

This invention further contemplates incorporation of a dichromatic coloring matter in the liquid crystal layer. Typical dichromatic coloring materials available for incorporation are shown below.

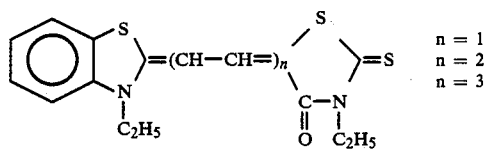

-continued
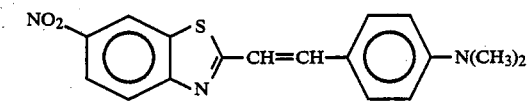
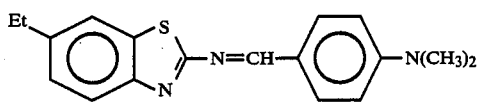
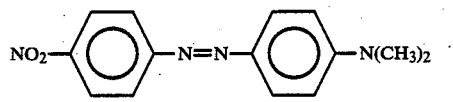
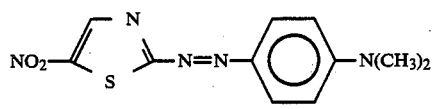
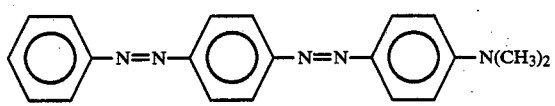
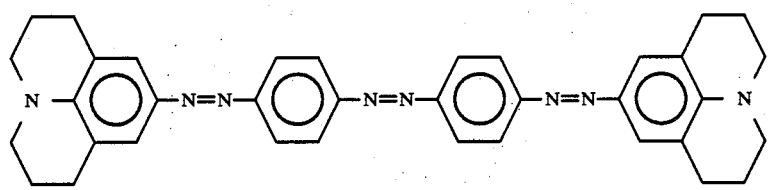
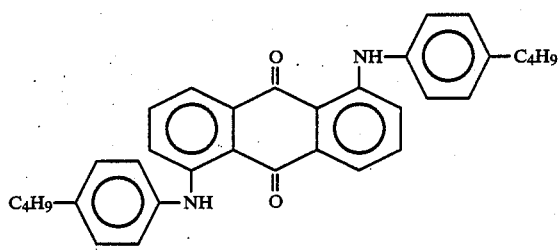
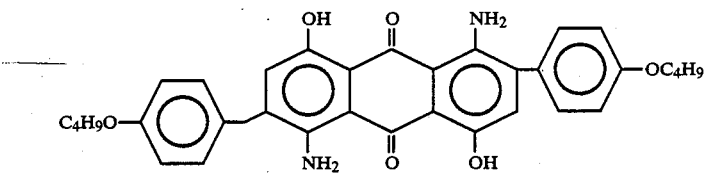
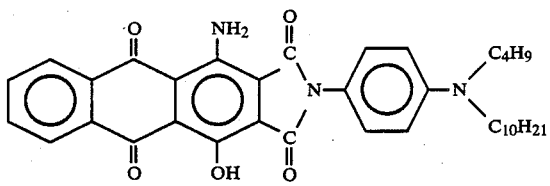
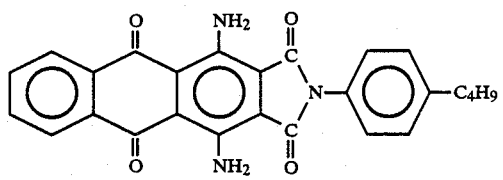

-continued

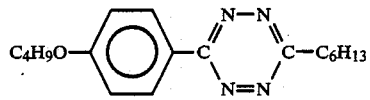

The content of the dichromatic coloring matter in the liquid crystal layer is desired to be in the range of 0.1 to 10% by weight, preferably 0.5 to 5% by weight.

The photorecording element of this invention, as described above, comprises a transparent substrate, a molecular layer of an organic compound capable of reversibly changing structure by virtue of light, and a layer of liquid crystal. When the liquid crystal is of such a quality that has a dependency upon temperature, namely a quality of causing no change in structure upon exposure to light at normal room temperature but producing a change in structure upon exposure to light at a temperature exceeding a certain level, the photorecording element is enabled to effect permanent recording. The liquid crystal cell which incorporates the photorecording element can be effectively utilized in various devices.

Now, the present invention will be described further in detail below with reference to the accompanying drawings.

FIG. 1 is a cross section illustrating the basic construction of the photorecording element of the present invention. On a transparent substrate 1, a liquid crystal layer 3 is disposed through the medium of a molecular layer 2 of a compound capable of producing a reversible change in structure by virtue of light. Generally, the liquid crystal layer is further coated with another substrate to ensure fixation of the liquid crystal layer and prevent it from diffusion. This additional substrate may be transparent or opaque. Optionally, this additional substrate may be coated with a molecular layer of a compound capable of reversibly producing a change in structure by virtue of light or with a homogeneous orientation layer capable of arranging a liquid crystal parallel to the surface thereof.

Figure 2:
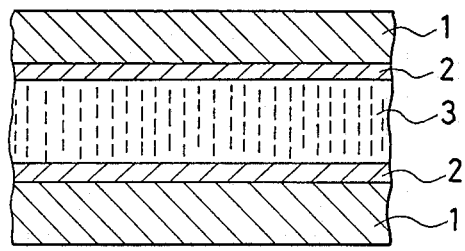
FIG. 2 is a cross section illustrating a typical liquid crystal cell comprising the photorecording element of the present invention.
Figure 2:
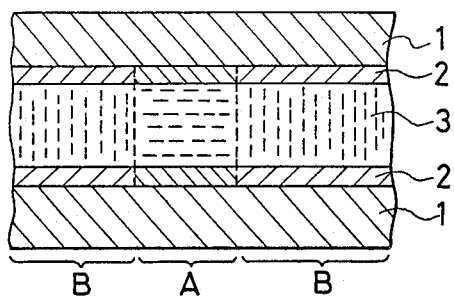

FIG. 2 is a cross section illustrating a typical liquid crystal cell incorporating a photorecording element as a preferred embodiment of this invention. This liquid crystal cell is so constructed as to have a liquid crystal phase sandwiched between two substrates 1 each having a molecular layer 2 of a photochromic compound formed on the surface.

FIG. 2 (I) depicts a state which exists before exposure to light and FIG. 2 (II) a state which exists after the exposure to light. Prior to the exposure to light, owing to the action of the molecular layer of the photochromic compound, the liquid crystals in the liquid crystal layer are regularly arranged in the direction perpendicular (homeotropic) to the surface of the substrate (I). When a portion (A) of the photorecording element is exposed to light, since the photochromic compound in the corresponding portion produces a change in structure, the aforementioned arrangement in the affected portion is disrupted and, the liquid crystals in this portion are rearranged parallel to the surface. In the portion of the molecular layer of the photochromic compound which has produced the change in structure by virtue of light, the long axes of the liquid crystals are arranged parallel to the surface. This fact has been found for the first time by inventors.

On observation under crossed polarizers, the portion (A) exposed to light permits the passage of light while the portion (B) not exposed to light prevents the passage of light. By the use of polarized light of a desired wavelength, therefore, the information of light recorded in the liquid crystal cell can be read through the agency of transmittance of light.

Figure 3:
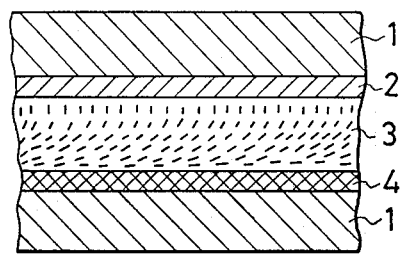
FIG. 3 is a cross section illustrating another typical liquid crystal cell comprising the photorecording element of the present invention.
Figure 3:
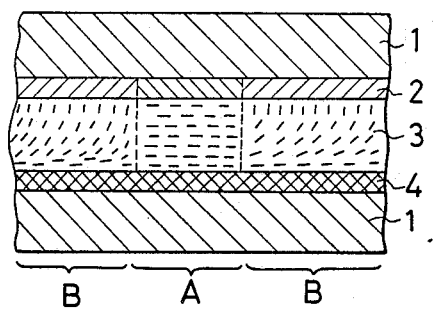

FIG. 3 illustrates a typical liquid crystal cell as another embodiment of this invention differing from that of FIG. 2. This embodiment is characterized by having one of the two substrates provided with a homogeneous orientation layer 4. This homogeneous orientation layer can be formed by subjecting the surface of the substrate to a rubbing treatment with poly(vinyl alcohol), polyimide resin, or polyoxyethylene or by vacuum depositing such an oxide as $SiO_2$ diagonally on the surface. In the illustrated embodiment, those of the liquid crystals disposed on the molecular photochromic compound layer side are arranged in the direction perpendicular to the surface of the substrate and those disposed on the homogeneous orientation layer side are arranged in the direction parallel to the substrate as illustrated in FIG. 3 (I). When the liquid crystal cell of this embodiment is exposed to light, the liquid crystals in the portion (A) of the liquid crystal layer exposed to light are rearranged, parallel to the surface of the molecular photochromic compound layer and are allowed to assume the state of homogeneous arrangement as a whole. In the same manner as in the preceding embodiment, therefore, the information recorded in light in this liquid crystal cell can be read by virtue of polarization.

Figure 4:
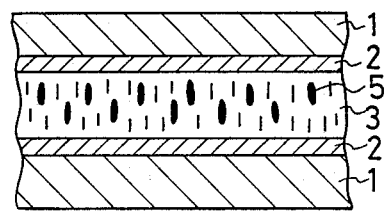
FIG. 4 is a cross section illustrating a typical liquid crystal cell having a dichroic dye contained in the liquid layer.
Figure 4:
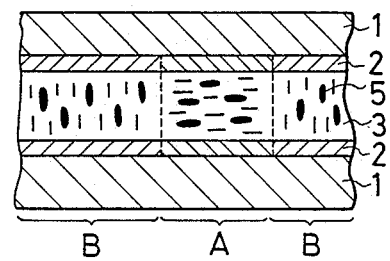
Figure 5:
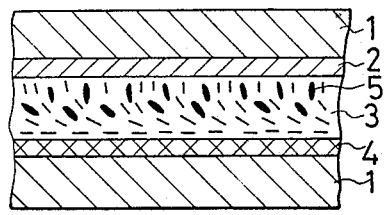
FIG. 5 is a cross section illustrating another typical liquid crystal cell having a dichroic dye contained in the liquid crystal layer.
Figure 5:
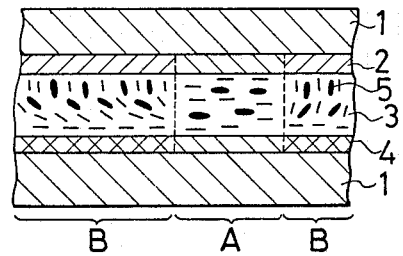

The liquid crystal cells obtained by modifying the embodiments of FIG. 2 and FIG. 3 owing to the incorporation of a dichroic dye 5 in the liquid crystal layer are illustrated respectively in FIG. 4 and FIG. 5. The dichroic dye 5 possesses entirely the same orientation property and behavior as the liquid crystals. Specifically, in the molecular photochromic compound layer which has changed structure by virtue of light, the long axes of the liquid crystals are arranged parallel to the surface and the dichroic dye is correspondingly arranged parallel. This fact has been found for the first time by the inventors. In this case, the information recorded in light in the present liquid crystal cell by virtue of transmittance of light at the wavelength absorbed by the coloring matter because the portion (B) not exposed to light retains a light color while the portion (A) exposed to light changes to a darker color. When the dichroic dye is properly selected, it cannot disrupt the recorded information because it permits the light of a wavelength incapable of inducing photochromism to be utilized in the reading of the information.

Figure 6:
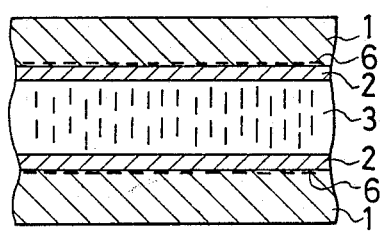
FIG. 6 is a cross section illustrating a typical liquid crystal cell of this invention having fine deformations imparted to the opposed surfaces of two substrates held in direct contact with the layer of the organic compound, the fine deformations on the two substrates occurring in mutually parallel directions.
Figure 6:
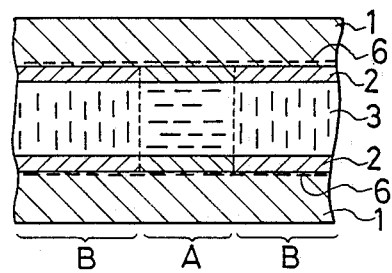
Figure 7:
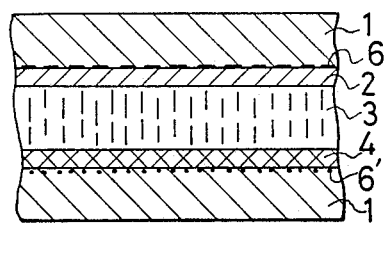
FIG. 7 is across section illustrating another liquid crystal cell having similar fine deformations imparted to the opposed surfaces of two substrates, the fine deformations occurring in two perpendicularly intersecting directions.
Figure 7:
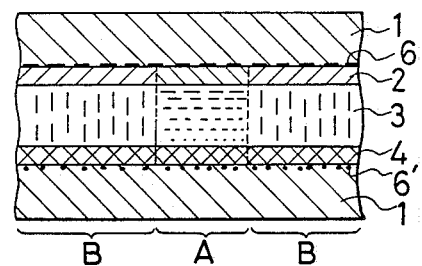

FIG. 6 and FIG. 7 illustrate typical liquid crystal cells having fine uniaxial deformations 6, 6' formed on the surfaces of the substrates held in direct contact with the layer of an organic compound capable of changing structure by virtue of light. In FIG. 6, the deformations 6, 6 on the two substrates occur in mutually parallel direction. In FIG. 7, the deformations 6, 6' occur in perpendicularly intersecting directions.

In the liquid crystal cell of FIG. 6, similarly to that of FIG. 2, since the photochromic compound in the portion (A) produces a change in structure on exposure to light, the aforementioned vertical arrangement of liquid crystals in that portion is disrupted and the liquid crystals are rearranged parallel (homogeneous) to the surface. In the molecular photochromic compound layer which has produced a change in structure by virtue of light, when the surfaces thereof are finely deformed in advance, the long axes of the liquid crystals are rearranged in one direction parallel to the surface This fact has been found for the first time by the inventors.

When this photorecording element is sandwiched between two polarizers whose axes of polarization perpendicularly intersect each other, therefore, the produced device produces a clear image because the portion (B) not exposed to light remains dark and the portion (A) exposed to light grows bright This device cannot cause disruption of recorded information because it permits use of a polarized light of a wavelength incapable of causing photochromism for the reading of the recorded information.

FIG. 7 illustrates an embodiment in which two substrates having fine deformations formed on their surfaces in advance are so disposed that the directions of such fine deformations perpendicularly intersect each other. In this case, since the liquid crystal layer of the portion exposed to light assumes a twisted nematic phase, it is allowed to produce an optically clear image by the conventional method.

Figure 8:
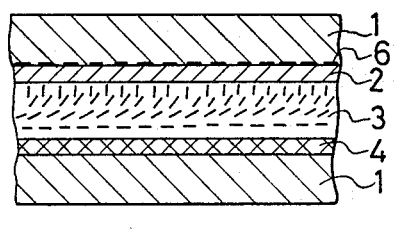
FIG. 8 is a cross section illustrating a typical liquid crystal cell having the same fine deformations as those of FIG. 6 and FIG. 7 imparted to one of the opposed substrates and having a layer of homogeneous orientation imparted to the other substrate.
Figure 8:
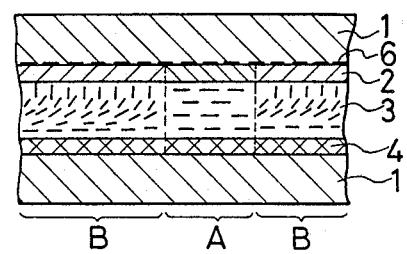

FIG. 8 illustrates an embodiment in which a homogeneous orientation layer is formed on one of the two substrates similarly to the embodiments of FIG. 3 and FIG. 5.

In the photorecording element of the present invention, erasure of recorded information is attained by causing the photochromic compound to resume its original structure by exposing the photorecording element to a light of a wavelength different from that of the light used during the course of recording.

The photorecording element of the present invention has the advantage that it is free from the drawback encountered during the recording of information with the conventional photochromic material, namely the drawback that the information once recorded gradually disappears with the repetition of the optical reading of this information. Further, since the arrangement of liquid crystals is governed by the molecular photochromic compound layer, the resolving power exhibited by the liquid crystals of fluid constitution is far better than when the conventional liquid crystal layer incorporating a photochromic compound is used. Besides being usable for storage of reversible information with light, the photorecording element of the present invention can be advantageously utilized for the light address type display.

Now, the present invention will be described more specifically below with reference to working examples.

EXAMPLE 1

One g. ($3.73 \times 10^{-3}$ mol) of 4'-hexyl-4-hydroxyazobenzene (1) converted into a sodium salt with sodium methylate and 1.03 g ($3.69 \times 10^{-3}$ mol) of 2-tetrahydropyranyl 6-bromohexanoate and 5 ml of dimethylacetamide added thereto were heated for reaction at 100° C. for 73 hours. After the reaction was completed, the reaction mixture was diluted with water and left to cool to room temperature. The yellow crystals which were consequently precipitated were separated by filtration. The crystals were extracted with ethyl acetate, dried with magnesium sulfate, and subjected to vacuum distillation for expulsion of the solvent. The residue of the vacuum distillation was recrystallized with a mixture of hexane with benzene. Consequently, 1 g of 6-[4-(4-hexylphenylazo)-phenoxy]-hexanoic acid was obtained. A mixture of 200 mg ($5.05 \times 10^{-4}$ mol) of this carboxylic acid with 5 ml of thionyl chloride was refluxed for 2 hours to expel excess thionyl chloride and then mixed with 3 ml of dry ether and 0.15 g ($1.485 \times 10^{-3}$ mol) of triethylamine. This mixture kept cooled with ice and a solution of 0.11 g ($4.98 \times 10^{-4}$ mol) of triethoxyaminopropylsilane in 3 ml of dry ether added dropwise thereto were stirred for two hours, then filtered to expel the formed salt in an atmosphere of nitrogen gas, and subjected to vacuum distillation at room temperature to expel the solvent. Consequently, 213 mg of yellow waxy N-(3-triethoxysilylpropyl)-6-[4-(4-hexylphenylazo)phenoxy]hexanoic acid amide was obtained.

Clean quartz plates were kept immersed for 10 minutes in ethanol solution containing 0.4 wt % of the triethoxysilyl azobenzene derivative, then dried in an air stream, and dried at 100° C. for 10 minutes. In methylene chloride, the dry quartz plates were washed with ultrasonic waves for five minutes and then dried at 100° C. for 10 minutes. The quartz plates had the opposite surfaces thereof modified with azobenzene exhibited an absorbance of 0.0316 at a wavelength of 348.5 nm. They were colorless and transparent.

A mass of cyclohexanecarboxylic phenyl ester type mixed liquid crystal (K-17-N-73-1) containing glass rod spacers of 8 μm in thickness was sandwiched between two quartz plates treated in advance as described above and then sealed with epoxy resin to complete a sandwich cell. This colorless transparent cell was interposed between crossed polarizers and tested for transmittance of a He-Ne laser beam. Before exposure to an ultraviolet light, the transmittance under the crossed polarizers was zero, indicating that the liquid crystals were arranged in a homeotropic mode. When the cell was exposed to an ultraviolet light at 365 nm, the transmittance was increased in proportion as the photoisomerization of the azobenzene from the trans to the cis form. When the cell was exposed to a visible light exceeding 440 nm, the transmittance began to decrease as the isomerization of the azobenzene to the trans form proceeded. The transmittance reversibly changed by alternate exposure of the cell to the ultraviolet light and the visible light. When the same cell was exposed to ultraviolet light through a negative, the image on the negative was clearly visible under crossed polarizers. This image remained undisturbed even when pressure was exerted upon the cell to fluidify the liquid crystals.

EXAMPLE 2

The triethoxysilyl azobenzene obtained in Example 1 and aminopropyltriethoxysilane were mixed at a gravimetric ratio of 1:9. Quartz plates were treated with an ethanol solution containing 0.4 wt % the resultant mixture in the same manner as in Example 1. The same mixed liquid crystal was interposed in a thickness of 8 μm between two quartz plates treated in advance as described above to complete a sandwich cell. When this cell was alternately exposed to an ultraviolet light and a visible light, a reversible change in transmittance was observed under crossed polarizers.

EXAMPLE 3

The procedure of Example 1 was followed to produce a sandwich cell containing the same mixed liquid crystal in a thickness of 8 μm between a quartz plate treated with the azobenzene in the same manner as in Example 1 and a quartz plates coated with poly(vinyl alcohol) and then given a rubbing treatment. When this cell was exposed alternately to an ultraviolet light and a visible light, a reversible change in transmittance was observed under crossed polarizers.

EXAMPLE 4

Quartz plates were treated with silylizing agents produced by following the procedure of Example 1, except that 4-hydroxyazobenzene, 4-methyl-4-hydroxyazobenzene, 4'-hexyl-4-hydroxyazobenzene, 4'-octyl-4-hydroxyazobenzene, and 4'-chloro-4-hydroxyazobenzene were severally used in place of 4'-hexyl-4-hydroxyazobenzene. Then, sandwich cells were formed by interposing the same mixed liquid crystals between the treated quartz plates. On alternate exposure to an ultraviolet light and a visible light, these cells invariably showed a reversible change in transmittance.

EXAMPLE 5

Aminated quartz plates were prepared by treating quartz plates by the conventional method using an ethanol solution of aminopropyltriethoxysilane. In a solution obtained by dissolving in methylene chloride the azobenzenecarboxylic acid chloride obtained in Example 1, the aminated quartz plates were immersed and, with triethylamine added thereto, were left standing at room temperature for one hour. Thus treated quartz plates were washed with methylene chloride and ethanol and then dried at 100° C. for 10 minutes. By a test with an ultraviolet-visible spectrophotometer, they were found to have an azobenzene group bonded thereto. When a mixed liquid crystal cell formed of these quartz plates modified with azobenzene was exposed alternately to an ultraviolet light and a visible light, it showed a reversible change in transmittance.

EXAMPLE 6

In 2 ml of benzene, 0.4 g of 4'-hexyl-4-hydroxyazobenzene and a catalytic amount of trimethylbenzylammonium hydroxide were dissolved. To the resultant solution, 8 ml of acrylonitrile was slowly added. The resultant mixture was heated for 22 hours and then subjected to vacuum distillation for expulsion of the solvent. The residue of the distillation was extracted with benzene. It was then purified by silica gel column chromatography. Consequently, 0.25 g of 2-[4-(4-(hexylphenylazo)phenoxy]propanenitrile was obtained. This product was converted into a corresponding carboxylic acid by hydrolysis with acetic acid containing hydrochloric acid. The carboxylic acid was again converted into an acid chloride with thionyl chloride. Then, by following the procedure of Example 5, aminated quartz plates were treated with the acid chloride. The absorption spectrum of the treated aminated quartz plates indicated that the azobenzene was bonded to the quartz plates. When a mixed liquid crystal cell formed of these quartz plates was alternately exposed to an ultraviolet light and a visible light, it showed a reversible change in transmittance.

EXAMPLE 7

With quartz plates modified with the azobenzene prepared in Example 1, 4-octyl-4'-cyanobiphenyl (K-21-S-33; -N-40-1) assuming a smectic liquid crystal phase at room temperature was sandwiched to complete a sandwich cell (8 μm in cell thickness). When this sandwich cell was exposed to an ultraviolet light at room temperature (about 20° C.), it showed absolutely no discernible change in liquid crystal phase. When this sandwich cell was heated to 35° C. and then exposed to an ultraviolet light, it showed a discernible change in transmittance under crossed polarizers. An image obtained by exposing this cell through a negative to an ultraviolet light at 35° C. remained stably for six months at room temperature. This image was not erased even when the cell was exposed to a visible light. The results clearly indicate that the smectic liquid crystal possessed a memory effect.

EXAMPLE 8

The azobenzene obtained in Example 1 was dissolved in a concentration of 0.5% by weight in the mixed liquid crystals. The mixed liquid crystals were interposed between two glass plates with the aid of glass spacers 12 μm in thickness to complete a cell. Under crossed polarizers, this cell showed no transmittance, indicating that the liquid crystals were arranged in a homeotropic mode. When this cell was exposed to an ultraviolet light through a negative containing an image, the image was observed under crossed polarizers. When the cell was exposed to a visible light, the image immediately disappeared.

EXAMPLE 9

A silylizing agent was produced by following the procedure of Example 1, except that 2-tetrahydropyranyl 4-bromobutanoate was used in place of 2-tetrahydropyranyl 6-bromohexanoate. Glass plates were treated with this silylizing agent. A sandwich cell produced by interposing the same mixed liquid crystals as used in Example 1 between the glass plates showed a discernible change in transmittance under crossed polarizers.

EXAMPLE 10

Ethyl 2-[4-(4-hexylphenylazo)phenoxy]acetate was synthesized by following the procedure of Example 1, except that ethyl chloroacetate was used in place of 2-tetrahydropyranyl 6-bromohexanoate. This compound was hydrolyzed and similarly treated to produce a silylizing agent. Glass plates were treated with this silylizing agent. The absorption spectrum of the treated glass plates indicated that the azobenzene was bonded to the glass plates. A sandwich cell produced by interposing the mixed liquid cells between the glass plates showed a reversible change in transmittance under crossed polarizers when it was exposed alternately to an ultraviolet light and visible light.

EXAMPLE 11

A silylizing agent was produced by following the procedure of Example 1, except that 3-aminopropylmethyldiethoxysilane was used in place of triethoxyaminopropylsilane and the amidation was carried out by using dicyclohexylcarbodiimide in methylene chloride. Glass plates were similarly treated with this silylizing agent. A sandwich cell was produced by interposing the same mixed liquid crystals between the glass plates. In this cell, the liquid crystals were arranged in a homeotropic mode. When this cell was exposed alternately to an ultraviolet light and a visible light, it showed a reversible change in transmittance under crossed polarizers.

EXAMPLE 12

A silylizing agent was produced by following the procedure of Example 1, except that 4-aminobutyltriethoxysilane was used in place of triethoxyaminopropylsilane and the amidation was carried out by using dicyclohexylcarbodiimide in methylene chloride. Glass plates were similarly treated with the silylizing agent. A sandwich cell produced by interposing the same mixed liquid crystals between the glass plates showed a reversible change in transmittance under crossed polarizers when it was exposed alternately to an ultraviolet light and a visible light.

EXAMPLE 13

A silylizing agent was produced by following the procedure of Example 1, except that 4-aminobutyldimethylmethoxysilane was used in place of triethoxyaminopropylsilane and the amidation was carried out by using dicyclohexylcarbodiimide in methylene chloride. Glass plates were treated with this silylizing agent and the same mixed liquid crystals were interposed between the glass plates to produce a sandwich cell. This cell was interposed between crossed polarizers and tested for transmittance of a He-Ne laser beam. Before exposure to an ultraviolet light, the cell under crossed polarizers showed a transmittance of 40% (based on the transmittance through two parallel placed polarizers in the absence of the cell taken as 100). When this cell was exposed to an ultraviolet light of a wavelength of 365 nm, the transmittance decreased as the photoisomerization of the azobenzene from the trans to the cis form proceed. When the cell was exposed to a visible light of a wavelength exceeding 440 nm, the transmittance began to increase as the photoisomerization to the trans form proceeded. This transmittance reversibly changed as the alternate exposure of the cell to the ultraviolet light and the visible light proceeded.

EXAMPLE 14

By faithfully repeating the procedure of Example 1, 213 mg of N-(3-triethoxysilylpropyl)-6-[4-(4-hexylphenylazo)phenoxy]hexanoic acid amide was obtained by using 4'-hexyl-4-hydroxyazobenzene. In an ethanol solution containing 0.4 wt % 1:9 wt/wt triethoxysilyl azobenzene/ethyltriethoxysilane, clean quartz plates (1×3 cm$^2$) rubbed with cotton cloth in one direction in advance were kept immersed for ten minutes, dried in an air stream, and the dried at 100° C. for 10 minutes. These quartz plates had their surfaces modified with azobenzene. They showed an absorbance of 0.010 at a wavelength of 340 nm. They were colorless and transparent. A sandwich cell was produced in the same manner as in Example 1 with two of the thus treated quartz plates so disposed that the directions of rubbing treatment coincided. When this cell was tested for transmittance of a He-Ne laser beam, the change in transmittance was the same as in Example 1. In this example, the transmittance was largest and the liquid crystals were arranged in a homogeneous mode when the direction of rubbing treatment was 45 degrees from the polarizer. When the cell was exposed to a visible light of a wavelength of not less than 440 nm and then exposed to an ultraviolet light through a negative, the results were the same as in Example 1.

EXAMPLE 15

The same triethoxysilylazobenze as obtained in Example 1 and aminopropyltriethoxysilane were mixed in a gravimetric ratio of 1:9. Quartz plates given a rubbing treatment in advance were treated with an ethanol solution containing 0.4 wt % of the resultant mixture in the same manner as in Example 14. A sandwich of the resultant mixture was formed in the same manner as in Example 14. A sandwich cell was formed by interposing the same mixed liquid crystals in a thickness of 8 μm between the two quartz plates. When this cell was exposed alternately to an ultraviolet light and a visible light, it showed a reversible change in transmittance under crossed polarizers. When the cell was exposed over the whole surface thereof to an ultraviolet light and then exposed to an Ar laser beam at a wavelength of 488 nm through a negative film, a clear image was formed in the cell.

EXAMPLE 16

A sandwich cell was produced by interposing the same mixed liquid crystals in a thickness of 8 μm between a quartz plates treated in advance with the same azobenzene as obtained in Example 14 and a quartz plates coated with poly(vinyl alcohol) and then treated by rubbing. In this case, the quartz plates were disposed so that the direction of rubbing of the quartz plates and the direction of rubbing effected after application of poly(vinyl alcohol) coincided. When this sandwich cell was exposed alternately to an ultraviolet light and a visible light, it showed a reversible change in transmittance under crossed polarizers The results indicate that the reversible change occurred in the arrangement of liquid crystals between the homeotropic mode and the hybrid mode.

EXAMPLE 17

Silylizing agents were produced by following the procedure of Example 14, except that 4-hyroxyazobenzene, 4-methyl-4'-hydroxyazobenzene, 4-cyclohexyl-4'-hydroxyazobenzene, and 4-octyl-4'-hydroxyazobenzene were severally used in place of 4-hexyl-4'-hydroxyazobenzene. Quarts plates given a rubbing treatment in advance were treated with the silylizing agents. Sandwich cells were produced by interposing the same mixed liquid crystals between the quartz plates in such a manner that the directions of rubbing treatment coincided. When these cells were exposed alternately to an ultraviolet light and a visible light, they showed a reversible change in transmittance under crossed polarizers.

EXAMPLE 18

Quartz plates given a rubbing treatment by the conventional method in advance were treated with a solution of aminopropyltriethoxysilane in ethanol, to obtain aminated quartz plates. In a solution prepared by dissolving in methylene chloride the same azobenzenecarboxylic acid chloride as obtained in Example 1, the aminated quartz plates were immersed and, with triethylamine added to the solution, were left standing at room temperature for one hour. The quartz plates were cleaned with methylene chloride and ethanol and then dried at 100° C. for 10 minutes. By a test with an ultraviolet-visible spectrophotometer, the quartz plates were found to have azobenzene group bonded thereto. A mixed liquid crystal cell was formed by using two azobenzene-modified quartz plates in such a manner that the directions of rubbing were parallel to each other. When this cell was exposed alternately to an ultraviolet light and a visible light, it showed a reversible change in transmittance.

EXAMPLE 19

In 2 ml of benzene, 0.4 g of 4-hexyl-4'-hydroxyazobenzene and a catalytic amount of trimethylbenzylammonium hydroxide were dissolved. To the resultant solution, 8 ml of acrylonitrile was slowly added. The resultant mixture was heated for 22 hours and then subjected to vacuum distillation for expulsion of the solvent. The residue of the distillation was extracted with benzene. Then, it was purified by silica gel column chromatography, to obtain 0.25 g of 2-[4-(4-hexylphenylazo)phenoxy]propanenitrile. This compound was converted to a corresponding carboxylic acid by hydrolysis with acetic acid containing hydrochloric acid. The carboxylic acid was converted into an acid chloride with thionyl chloride. The aminated quartz plates were treated with the acid chloride in the same manner as in Example 18. The absorption spectrum of the quartz plates indicated that the plates had azobenzene bonded thereto. A sandwich cell was produced by interposing the same mixed such a manner that the direction of rubbing perpendicularly intersected. When this cell was exposed alternately to an ultraviolet light and a visible light, it showed a reversible change in transmittance, indicating a change in the arrangement of liquid crystals between the homeotropic mode and the twisted mode.

EXAMPLE 20

The same azobenzene as prepared in Example 1 and ethyltriethoxysilane were mixed in a gravimetric ratio of 1:29. In an ethanol solution containing 0.4 wt % the resultant mixture, quartz plates given a rubbing treatment in advance were treated in the same manner as in Example 1. A sandwich cell (8 $\mu$m in cell thickness) was formed by interposing a layer of 4-octyl-4'-cyanobiphenyl (K-21-S-33-N-40-1), liquid crystals assuming a smectic phase at room temperature, between two such quartz plates disposed in such a manner that the directions of rubbing was parallel. The liquid crystals showed entirely no change in phase when this cell was exposed to an ultraviolet light at room temperature (about 20° C.). When the cell was heated to 35° C. and then exposed to an ultraviolet light, a change in transmittance was observed under cross polarizers. An image produced in the cell by exposing the cell at 35° C. to an ultraviolet light through a negative remained stably at room temperature for six months. This image was not erased when the cell was exposed to a visible light. The results indicate the smectic liquid crystals possessed a memory effect.

EXAMPLE 21

A sandwich cell was produced by following the procedure of Example 8, except that the two glass plates were given a rubbing treatment in advance. The characteristics manifested by this cell in response to lights for exposure were entirely the same as those of Example 8.

EXAMPLE 22

A sandwich cell was produced by following the procedure of Example 9, except that the glass plates were given a rubbing treatment in advance. The characteristic manifested by this cell in response to lights for exposure were entirely the same as those of Example 9.

EXAMPLE 23

A sandwich cell was produced by following the procedure of Example 10, except that the glass plates were given a rubbing treatment in advance. The characteristic manifested by this cell in response to lights for exposure were entirely the same as those of Example 10.

EXAMPLE 24

A sandwich cell was produced by following the procedure of Example 11, except that the glass plates were given a rubbing treatment in advance. The characteristic manifested by this cell in response to lights for exposure were entirely the same as those of Example 11.

EXAMPLE 25

A sandwich cell was produced by following the procedure of Example 12, except that the glass plates were given a rubbing treatment in advance. The characteristic were entirely the same as those of Example 12.

EXAMPLE 26

A sandwich cell was produced by following the procedure of Example 13, except that the glass plates were given a rubbing treatment in advance. This cell was interposed between crossed polarizers and tested for transmittance of a He-Ne laser beam. The transmittance under the crossed polarizers decreased as the photoisomerization of the azobenzene from the trans to the cis form proceeded. When the cell was exposed to a visible light of a wavelength exceeding 440 nm, the transmittance began to increase as the photoisomerization to the trans form proceeded. This transmittance reversibly changed as the alternate exposure of the cell to the ultraviolet light and visible light proceeded.

EXAMPLE 27

By faithfully following the procedure of Example 1, 213 mg of N-(3-triethoxysilylpropyl)-6-[4-(4-hexylphenylazo)phenoxy]hexaneamide was obtained from 4'-hexyl-4-hydroxyazobenzene. This triethoxysilylazobenzene and ethyltriethoxysilane were mixed at a gravimetric ratio of 1:9. Clean quartz plates (1×3 cm$^2$) were kept immersed in an ethanol solution containing 0.4 wt % the resultant mixture, dried in an air stream, and dried at 100° C. for 10 minutes. The dried quartz plates were cleaned in methylene chloride with ultrasonic waves for five minutes and then dried at 100° C. for 10 minutes. The quartz plates were found to have the opposite surfaces modified with azobenzene. They showed an absorbance of 0.010 at a wavelength of 340 nm. They were colorless and transparent. Between two quartz plates thus treated, cyclohexanecarboxylic acid phenyl ester type mixed liquid crystals containing 1% by weight of a dichroic dye of the structural formula (I) (K-17-N-73-1) and further containing glass rod spacers 8 $\mu$m in thickness were interposed and sealed with an epoxy resin, to produce a sandwich cell. When this cell was exposed to an ultraviolet light of a wavelength of 365 nm, the blue color of the coloring matter gained in density as the photoisomerization of the azobenzene from the trans to the cis form proceeded. When this cell was exposed to a visible light of a wavelength of about 440 nm, the blue color returned to the original density. This color tone was reversibly changed, depending on the alternate exposure of the cell to the ultraviolet light and the visible light. When this cell was exposed to the ultraviolet light through a negative image, a clear image was formed in the cell. This image was not disturbed when pressure was exerted upon the cell to fluidify the liquid crystals. The absorbance at the largest absorption wavelength (623 nm) of the coloring matter was 0.17 and 0.55 respectively before and after the exposure of the cell to the ultraviolet light.

The content of the dichroic dye in the liquid crystal layer was varied to determine the effect of the changing content of the dichroic dye upon the absorbance at the largest absorption wavelength of the coloring matter before and after the exposure to the ultraviolet light. The results are shown in the following table.

I

| No. | Concentration of dichroic dye (% by weight) | Absorbance at 623 nm | |
|---|---|---|---|
| | | Before exposure to ultraviolet light | After exposure to ultraviolet light |
| 1 | 1 | 0.17 | 0.55 |
| 2 | 2 | 0.20 | 0.44 |
| 3 | 3 | 0.31 | 0.69 |
| 4 | 4 | 0.38 | 0.82 |
| 5 | 5 | 0.60 | 1.05 |

EXAMPLE 28

A sandwich cell was formed by interposing mixed liquid crystals containing 5% by weight of a coloring matter of the following formula II instead of the dichroic dye I in a thickness of 8 μm between two quartz plates given a coating treatment with azobenzene in advance in the same manner as in Example 27. When this cell was exposed alternately to an ultraviolet light and a visible light, it showed a reversible change in density of the red color of the coloring matter.

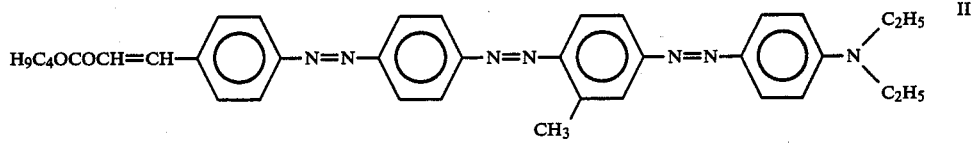

EXAMPLE 29

A silylizing agent was produced by following the procedure of Example 27, except that 4-methyl-4'-hydroxyazobenzene was used in place of 4-hexyl-4'-hydroxyazobenzene. Glass plates were treated with this azobenzene. A sandwich cell was produced by interposing the same mixed liquid crystals containing 2% by weight of the coloring matter I between the glass plates. When this sandwich cell was exposed alternately to an ultraviolet light and a visible light, a reversible change in density of the blue color of the coloring matter was observed.

EXAMPLE 30

A silylizing agent was prepared by following the procedure of Example 27, except that 4-cyclohexyl-4'-hydroxyazobenzene was used in place of 4-hexyl-4'-hydroxyazobenzene. Glass plates were treated with this azobenzene. A sandwich cell was produced by interposing the same mixed liquid crystals containing 25 by weight of the coloring matter II between the glass plates. When this sandwich cell was exposed alternately to the ultraviolet light and the visible light, a reversible change in density of the red color of the coloring matter was observed.

What is claimed is:

1. A photorecording element consisting of:
   a transparent substrate;
   one or more monomolecular layers of photochromic compound disposed in direct contact with said transparent substrate and capable of reversibly changing its structure by virtue of light; and
   a layer of liquid crystals of one type selected from the group consisting of nematic, smectic and cholesteric types, said layer of liquid crystals being disposed in direct contact with said layer of photochromic compound and the long axes of said liquid crystals being arranged perpendicular to the surface of the substrate so that when the photochromic compound is exposed to light and consequently changes its structure, the long axes of said liquid crystals rearrange in the parallel direction to said surface.

2. The photorecording element according to claim 1, wherein said layer of photochromic compound is a monomolecular layer.

3. The photorecording element according to claim 1, wherein said layer of liquid crystals contains a dichroic dye.

4. The photorecording element according to claim 3, wherein the content of said dichroic dye is in the range of 0.1 to 10 wt %, based on the weight of said layer of liquid crystals.

5. The photorecording element according to claim 1, wherein said transparent substrate is provided with fine concave and convex areas on the surface thereof which is held in direct contact with said layer of photochromic compound.

6. A liquid crystal cell comprising a photorecording element, said photorecording element consisting of:
   a transparent substrate;
   one or more monomolecular layers of photochromic compound disposed in direct contact with said transparent substrate and capable of reversibly changing its structure by virtue of light; and
   a layer of liquid crystals of one type selected from the group consisting of nematic, smectic and cholesteric types, said layer of liquid crystals being disposed in direct contact with said layer of photochromic compound and the long axes of said liquid crystals being arranged perpendicular to the surface of the substrate so that when the photochromic compound is exposed to light and consequently changes its structure, the long axes of said liquid crystals rearrange in the parallel direction to said surface.

7. The liquid crystal cell according to claim 6, wherein said layer of photochromic compound is a monomolecular layer.

8. The liquid crystal cell according to claim 6, wherein said layer of liquid crystals contains a dichroic dye.

9. The liquid crystal cell according to claim 8, wherein the content of said dichroic dye is in the range of 0.1 to 10 wt %, based on the weight of said layer of liquid crystals.

10. The liquid crystal cell according to claim 6, wherein said transparent substrate is provided with fine concave and convex areas on the surface thereof held in direct contact with said layer of photochromic compound.

* * * * *